(12) United States Patent
Park

(10) Patent No.: US 11,084,370 B1
(45) Date of Patent: Aug. 10, 2021

(54) HYBRID POWERTRAIN FOR VEHICLE

(71) Applicants: Hyundai Motor Company, Seoul (KR); Kia Motors Corporation, Seoul (KR)

(72) Inventor: Jong Yun Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/994,021

(22) Filed: Aug. 14, 2020

(30) Foreign Application Priority Data

Mar. 12, 2020 (KR) ........................ 10-2020-0030634

(51) Int. Cl.
*B60K 6/365* (2007.10)
*F16H 59/44* (2006.01)
*B60K 6/48* (2007.10)
*B60K 6/547* (2007.10)
*B60K 6/387* (2007.10)

(52) U.S. Cl.
CPC ............. *B60K 6/48* (2013.01); *B60K 6/365* (2013.01); *B60K 6/387* (2013.01); *B60K 6/547* (2013.01); *B60K 2006/4808* (2013.01); *B60K 2006/4816* (2013.01)

(58) Field of Classification Search
CPC ........ B60K 6/387; B60K 6/547; B60K 6/365; B60K 6/48; B60K 2006/4808; B60K 2006/4816; B60K 6/38; F16H 37/0826; F16H 37/0833; F16H 37/065; F16H 37/046; F16H 2200/0052; F16H 2200/2041; F16H 37/02–2037/108
See application file for complete search history.

(56) References Cited

U.S. PATENT DOCUMENTS

| | | | |
|---|---|---|---|
| 9,764,630 B2* | 9/2017 | Kaltenbach | B60K 6/48 |
| 10,391,851 B2* | 8/2019 | Ruan | B60K 6/52 |
| 2015/0226324 A1* | 8/2015 | Gluckler | F16H 3/006 74/664 |
| 2015/0321545 A1* | 11/2015 | Park | F16H 3/46 475/5 |
| 2016/0091955 A1* | 3/2016 | Black | G06F 1/3293 702/189 |
| 2016/0102742 A1* | 4/2016 | Lee | B60K 6/48 475/5 |

(Continued)

FOREIGN PATENT DOCUMENTS

KR    10-1573635 B1    11/2015

*Primary Examiner* — Charles A Fox
*Assistant Examiner* — Farhana Pervin
(74) *Attorney, Agent, or Firm* — Morgan, Lewis & Bockius LLP

(57) ABSTRACT

A hybrid powertrain for a vehicle may include a first input shaft connected to an engine, a second input shaft connected to the engine and coaxially mounted with the first input shaft, a motor input shaft coaxially mounted with the first input shaft and connected to a motor, first and second output shafts mounted in parallel to the first input shaft and the second input shaft, a variable drive gear provided at the motor input shaft to transmit power from the motor input shaft to the first output shaft, a complex synchronizer to couple and separate the first input shaft and the motor input shaft and to couple and separate the variable drive gear and the motor input shaft, and a plurality of external gear pairs configured to respectively define different gear ratios.

14 Claims, 8 Drawing Sheets

(56) References Cited

U.S. PATENT DOCUMENTS

2016/0167503 A1\* 6/2016 Lee .................... B60K 6/48
                                              475/5
2019/0225068 A1\* 7/2019 Liu .................... B60K 6/36

\* cited by examiner

HYBRID POWERTRAIN FOR VEHICLE

CROSS-REFERENCE TO RELATED APPLICATION

The present application claims priority to Korean Patent Application No. 10-2020-0030634, filed on Mar. 12, 2020, the entire contents of which is incorporated herein for all purposes by this reference.

BACKGROUND OF THE INVENTION

Field of the Invention

The present invention relates to the layout of a hybrid powertrain applicable to a vehicle.

Description of Related Art

A transmission-mounted electric device (TMED)-type hybrid powertrain is a hybrid powertrain in which a motor is mounted at a transmission rather than at an engine.

Among conventional TMED-type hybrid powertrains, which are constructed as described above, a structure in which an engine is connected to a motor via an engine clutch is extensively used. Because such a hybrid powertrain is provided with the engine clutch, manufacturing costs are increased due to the provision of the engine clutch. Furthermore, the rotation speed of the engine and the speed of the motor are restricted to the same level upon coupling of the engine clutch. Furthermore, because a shift map is set according to the optimal operational point of the engine but the main operation range of the motor is concentrated in a low speed range, it is difficult to realize optimal performance of the motor. Furthermore, because the motor is positioned at the input side of the transmission, the path of power transmission between the drive wheel and the motor is complicated upon regenerative braking, lowering the efficiency of regenerative braking.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid powertrain for a vehicle, in which an engine clutch for performing coupling and separation between an engine and a motor is omitted to reduce manufacturing costs and weight of the vehicle, the motor is controlled independently of the engine to enable optimal operation of the motor as well as the engine, and the path of power transmission between the motor and the drive wheel is shortened upon regenerative braking, improving efficiency of an EV mode and of regenerative braking.

In accordance with various aspects of the present invention, the above and other objects may be accomplished by the provision of a hybrid powertrain for a vehicle including a first input shaft selectively connectable to an engine via a first clutch, a second input shaft selectively connectable to the engine via a second clutch and is coaxially mounted with the first input shaft, a motor input shaft coaxially mounted with the first input shaft and connected to a motor, first and second output shafts, each of which is mounted in parallel to the first input shaft and the second input shaft, a variable drive gear provided at the motor input shaft to transmit power from the motor input shaft to the first output shaft in a state in which a rotation speed of the motor input shaft is maintained or increased, a complex synchronizer configured to separately perform coupling and separation between the first input shaft and the motor input shaft and coupling and separation between the variable drive gear and the motor input shaft, and a plurality of external gear pairs, which are configured to respectively define different gear ratios between the first input shaft and the first output shaft, between the first input shaft and the second output shaft, between the second input shaft and the first output shaft and between the second input shaft and the second output shaft, wherein a plurality of gear ratios between the plurality of external gear pairs and two gear ratios between the variable drive gear and the first output shaft form a series of gear ratios, which is employed in driving the vehicle.

The complex synchronizer may include a hub mounted on the motor input shaft, and first and second sleeves, each of which is mounted on the hub to be independently slidable in an axial direction thereof.

The variable drive gear may be integrally provided with a clutch gear configured for being selectively engageable with the second sleeve of the complex synchronizer, a first rotation element may be provided to be held by a brake, and a second rotation element may be integrally connected to a third rotation element of a planetary gear set connected to the motor input shaft.

The complex synchronizer may form a synchronizer configured for connecting the motor input shaft to the first input shaft through synchronizing action by a synchronizer ring while the first sleeve is moved in the axial direction thereof, and the second sleeve may form a dog clutch together with the clutch gear of the variable drive gear.

An external gear pair between the first input shaft and the first output shaft may be configured to define a fourth-speed gear ratio, an external gear pair between the first input shaft and the second output shaft may be configured to define a sixth-speed gear ratio, an external gear pair between the second input shaft and the first output shaft may be configured to define a fifth-speed gear ratio, an external gear pair between the second input shaft and the second output shaft may be configured to define a third-speed gear ratio, and the variable drive gear may transmit power to the first output shaft at the first-speed gear ratio and the second-speed gear ratio.

The first input shaft may be provided with a first drive gear, which is used in common to implement the fourth-speed gear ratio and the sixth-speed gear ratio, the second input shaft may be provided with a second drive gear, which is used in common to implement the third-speed gear ratio and the fifth-speed gear ratio, the first output shaft may be provided with a fourth driven gear, which is engaged with the first drive gear, and a fifth driven gear, which is engaged with the second drive gear, and the second output shaft may be provided with a sixth driven gear, which is engaged with the first drive gear, and a third driven gear, which is engaged with the second drive gear.

The first drive gear may be mounted on the first input shaft such that rotation thereof is restricted, the second drive gear may be mounted on the second input shaft such that rotation thereof is restricted, the first output shaft may be provided with a fourth-fifth synchronizer configured to selectively hold the fourth driven gear or the fifth driven gear to restrict rotation thereof relative to the first output shaft, and the second output shaft may be provided with a third-sixth synchronizer configured to selectively connect the third driven gear or the sixth driven gear to the second output shaft to restrict rotation thereof relative to the second output shaft.

The first drive gear may be integrally provided with a clutch gear, which is selectively engageable with the first sleeve of the complex synchronizer.

The first output shaft may be provided with a first output gear, the second output shaft may be provided with a second output gear, and the first output gear and the second output gear may be engaged with a ring gear of a differential.

The first clutch and the second clutch may form a dual clutch formed at a single clutch housing, and the second input shaft may include a hollow shaft surrounding the first input shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
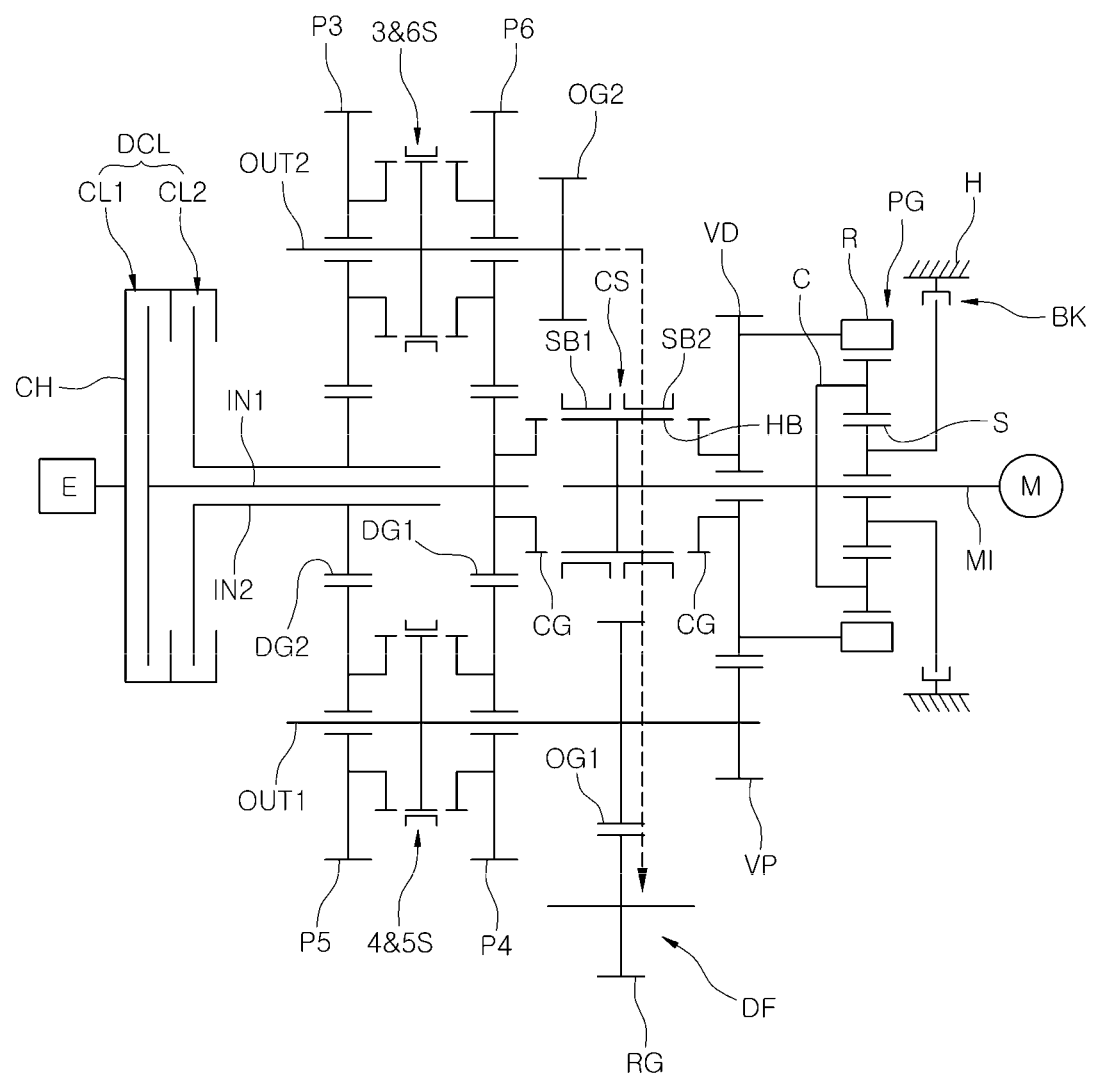
FIG. 1 is a view exemplarily illustrating the construction of a hybrid powertrain for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments of the present invention, examples of which are illustrated in the accompanying drawings. Wherever possible, the same reference numbers will be used throughout the drawings to refer to the same or like parts.

Hereinafter, an exemplary embodiment of the present invention will be described with reference to the accompanying drawings.

Referring to FIG. 1, a hybrid powertrain for a vehicle according to the exemplary embodiment of the present invention includes a first input shaft IN1 selectively connectable to an engine E via a first clutch CL1, a second input shaft IN2, which is selectively connectable to the engine E via a second clutch CL2 and is coaxially mounted with the first input shaft IN1, a motor input shaft MI, which is coaxially mounted with the first input shaft IN1 and is connected to a motor M, a first output shaft OUT1 and a second output shaft OUT2, which are mounted in parallel to the first input shaft IN1 and the second input shaft IN2, a variable drive gear VD provided at the motor input shaft MI to transmit the power from the motor input shaft MI to the first output shaft OUT1 in the state in which the rotation speed of the motor input shaft MI is maintained or increased, a complex synchronizer CS, configured to separately perform coupling and separation between the first input shaft IN1 and the motor input shaft MI and coupling and separation between the first drive gear DG1 and the motor input shaft MI, and a plurality of external gear pairs, which are configured to respectively define different gear ratios between the first input shaft IN1 and the first output shaft OUT1, between the first input shaft IN1 and the second output shaft OUT2, between the second input shaft IN2 and the first output shaft OUT1, and between the second input shaft IN2 and the second output shaft OUT2.

A plurality of gear ratios between the plurality of external gear pairs and the gear ratio between the variable drive gear VD and the first output shaft OUT1 form a series of gear ratios, which is employed to drive the vehicle.

According to the exemplary embodiment of the present invention, the plurality of external gear pairs are configured to define a third-speed gear ratio to sixth-speed gear ratio, and the variable drive gear VD is configured to define the first-speed gear ratio when transmitting the power from the motor input shaft MI in the state in which the rotation speed thereof is maintained and to define the second-speed gear ratio when transmitting the power from the motor input shaft MI in the state in which the rotation speed thereof is increased, with the result that the vehicle is configured for realizing a series of gear ratios from the first-speed gear ratio to the sixth-speed gear ratio.

The first clutch CL1 and the second clutch CL2 form a dual clutch DCL formed at a single clutch housing CH. The second input shaft IN2 includes a hollow shaft surrounding the first input shaft IN1, and the first output shaft OUT1 is provided with a first output gear OG1. The second output shaft OUT2 is provided with a second output gear OG2, and the first output gear OG1 and the second output gear OG2 are engaged with a ring gear RG of a differential DF.

The powertrain according to the exemplary embodiment of the present invention is constructed such that the power respectively transmitted to the first input shaft IN1 and the second input shaft IN2 from the engine E via the first clutch CL1 and the second clutch CL2 of the dual clutch DCL is transmitted to the differential DF via the variable drive gear VD, establishing the first to sixth forward gears, and smooth gear shifting is performed through gear-shifting action, which will be described later, without torque interruption, upon gear shifting.

Since the motor M is not coupled to the engine E via an engine clutch, obviating mounting of the engine clutch, it is possible to reduce the manufacturing costs and weight of the vehicle. Furthermore, since the motor M is controlled independently of the engine E, higher freedom in control of the motor M is ensured. Furthermore, since it is possible to transmit power between the motor M and a drive wheel through a relatively short power transmission path, it is possible to ensure high power transmission efficiency.

The complex synchronizer CS includes a hub HB mounted on the motor input shaft MI, and a first sleeve SB1 and a second sleeve SB2, which are mounted on the hub HB to be independently slidable.

The term "axial direction" used herein means the longitudinal direction of the motor input shaft MI.

The variable drive gear VD is integrally provided with a clutch gear CG, which is configured for being engaged with the second sleeve SB2 of the complex synchronizer CS. A first rotation element is configured to be held by a brake BK fixed to a transmission housing H, and a second rotation element is integrally connected to a third rotation element of a planetary gear set PG, which is connected to the motor input shaft MI.

Here, the first rotation element of the planetary gear set PG includes a sun gear S, the second rotation element includes a planet carrier C, and the third rotation element includes a ring gear R.

The second sleeve SB2 is engaged with the clutch gear CG of the variable drive gear VD, and the complex synchronizer CS connects the variable drive gear VD to the motor input shaft MI. When the brake BK is not coupled, the variable drive gear VD transmits the power from the motor input shaft MI to the first output shaft OUT1 without change. At the instant time, since it is considered that the ring gear R and the planet carrier C of the planetary gear set PG are connected to each other, all of the rotation elements are rotated with the variable drive gear VD at the same speed as the motor input shaft MI.

When the second sleeve SB2 is separated from the clutch gear CG of the variable drive gear VD and the brake BK is coupled, the power from the motor input shaft MI is input to the planet carrier C of the planetary gear set PG and the speed thereof is increased. Consequently, the variable drive gear VD, which is directly connected to the ring gear R, transmits the power from the motor input shaft MI to the first output shaft OUT1 in the state in which the speed thereof is increased.

The complex synchronizer CS forms a synchronizer configured for being connected to the first input shaft IN1 through synchronizing action by a synchronizer ring while the first sleeve SB1 is moved in the axial direction thereof, and the second sleeve SB2 forms a dog clutch together with the clutch gear CG of the variable drive gear VD.

According to the exemplary embodiment of the present invention, a first drive gear DG1, which will be described later, is integrally provided with the clutch gear CG, which forms a portion of the complex synchronizer CS such that the first input shaft IN1 is directly connected to the motor input shaft MI through the engagement between the clutch gear CG and the first sleeve SB1, as described above.

Since the synchronizer ring is provided between the clutch gear CG of the first drive gear DG1 and the first sleeve SB1, the first sleeve SB1 is engaged with the clutch gear CG of the first drive gear DG1 through the synchronizing action of the synchromesh-type synchronizer.

For reference, the synchronizer ring may be embodied by the same synchronizer ring as that used in a conventional synchromesh-type synchronizer, and an illustration thereof is thus omitted from the drawings.

As described above, the second sleeve SB2 of the complex synchronizer CS forms a dog clutch together with the clutch gear CG of the variable drive gear VD such that it is possible to actively perform synchronizing action by the motor M and a brake BK.

The external gear pair between the first input shaft IN1 and the first output shaft OUT1 are configured to define the fourth-speed gear ratio, and the external gear pair between the first input shaft IN1 and the second output shaft OUT2 are configured to define the sixth-speed gear ratio. The external gear pair between the second input shaft IN2 and the first output shaft OUT1 are configured to define the fifth-speed gear ratio, and the external gear pair between the second input shaft IN2 and the second output shaft OUT2 are configured to define the third-speed gear ratio. The variable drive gear VD is configured to transmit the power to the first output shaft OUT1 at the first-speed gear ratio and the second-speed gear ratio.

In other words, the first input shaft IN1 is provided with the first drive gear DG1, which is used in common to implement both the fourth-speed gear ratio and the sixth-speed gear ratio, and the second input shaft IN2 is provided with a second drive gear DG2, which is used in common to implement both the third-speed gear ratio and the fifth-speed gear ratio. The first output shaft OUT1 is provided with a fourth driven gear P4, which is engaged with the first drive gear DG1, and a fifth driven gear P5, which is engaged with the second drive gear DG2, and the second output shaft OUT2 is provided with a sixth driven gear P6, which is engaged with the first drive gear DG1, and a third driven gear P3, which is engaged with the second drive gear DG2.

The first drive gear DG1 is mounted on the first input shaft IN1 such that rotation thereof is restricted, and the second drive gear DG2 is mounted on the second input shaft IN2 such that rotation thereof is restricted. The first output shaft OUT1 is provided with a fourth-fifth synchronizer 4&5S configured to selectively hold the fourth driven gear P4 or the fifth driven gear P5 to restrict rotation thereof relative to the first output shaft OUT1, and the second output shaft OUT2 is provided with a third-sixth synchronizer 3&6S configured to selectively hold the third driven gear P3 or the sixth driven gear P6 to restrict rotation thereof relative to the second output shaft OUT2.

The first output shaft OUT1 is provided with a variable driven gear VP, which is engaged with the variable drive gear VD, in the state in which the rotation of the variable driven gear VD is restricted. Consequently, it is possible to transmit the power from the variable drive gear VD to the first output shaft OUT1.

Hereinafter, sequential gear-shifting procedures from the first gear to the sixth gear will be described with reference to FIGS. 2 to 6.

Figure 2A:
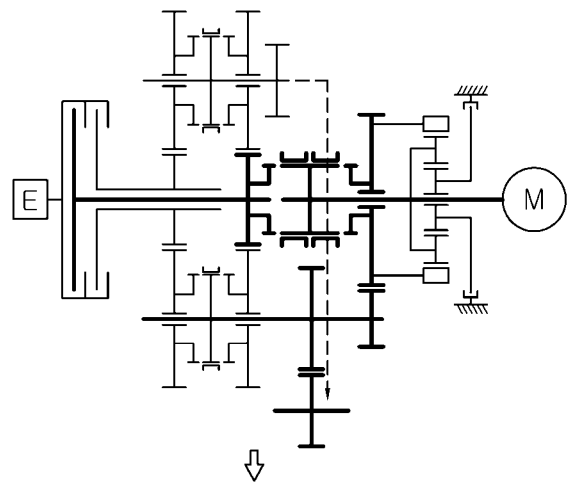
FIG. 2A, FIG. 2B, and FIG. 2C are views exemplarily illustrating a procedure of shifting a gear from a first gear to a second gear in the hybrid powertrain shown in FIG. 1.
Figure 2B:
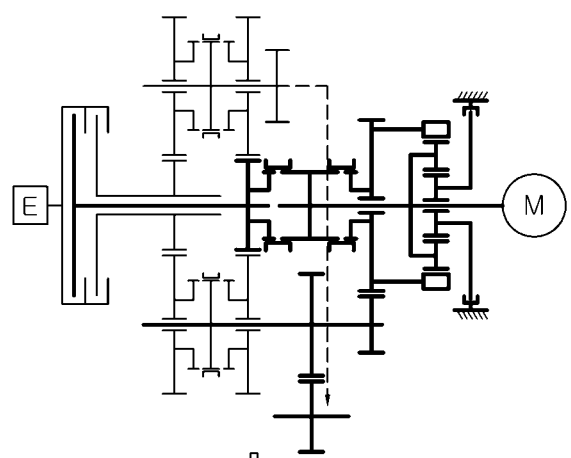
Figure 2C:
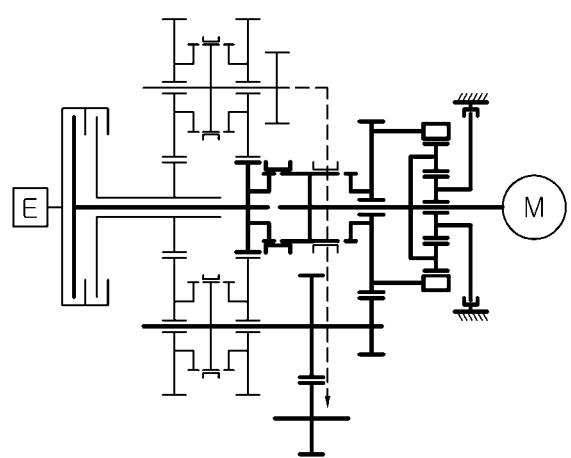

FIGS. 2A-2C illustrates a procedure of shifting a gear from the first gear to the second gear. In the state shown in FIG. 2A, the first clutch CL1 is coupled, and the first sleeve SB1 of the complex synchronizer CS connects the variable drive gear VD to the motor input shaft MI. Subsequently, the second sleeve SB2 connects the variable drive gear VD to the motor input shaft MI such that the power from the engine E is transmitted to the variable drive gear VD via the motor input shaft MI to drive the variable drive gear VD, implementing the first-speed gear ratio between the variable drive gear VD and the variable driven gear VP.

In the state shown in FIG. 2B, the second sleeve SB2 of the complex synchronizer CS is released to the neutral state by the application of force, and the brake BK begins to be coupled.

When the brake BK is coupled, the speed of the variable drive gear VD begins to increase compared to the speed of the motor input shaft MI. At the instant time, the direction of the torque acting between the hub HB of the complex synchronizer CS, the second sleeve SB2 and the clutch gear CG of the variable drive gear VD is changed. When the second sleeve SB2 is released to the neutral state while the direction of the torque is changed, the state shown in FIG. 2C is established. Since the speed of the power from the motor input shaft MI is increased by the planetary gear set PG, the power output via the variable drive gear VD and the variable driven gear VP becomes the output at the second-gear.

Figure 3A:
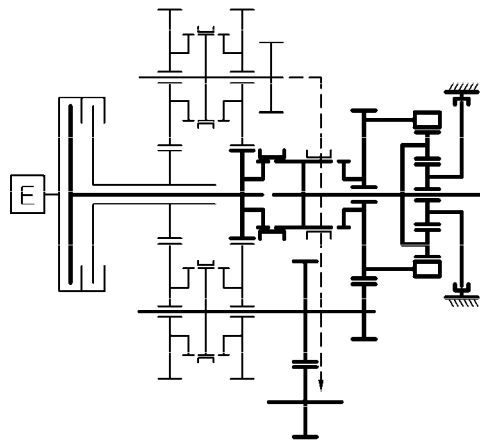
FIG. 3A, FIG. 3B, FIG. 3C and FIG. 3D are views exemplarily illustrating a procedure of shifting a gear from the second gear to a third gear in the hybrid powertrain shown in FIG. 1.
Figure 3B:
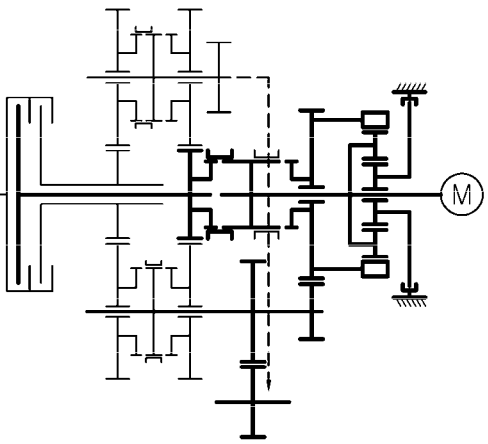
Figure 3D:
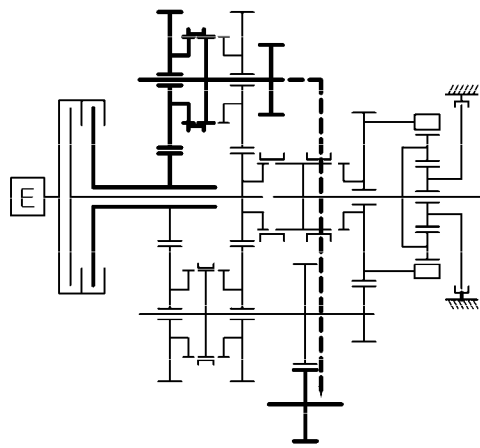
Figure 3C:
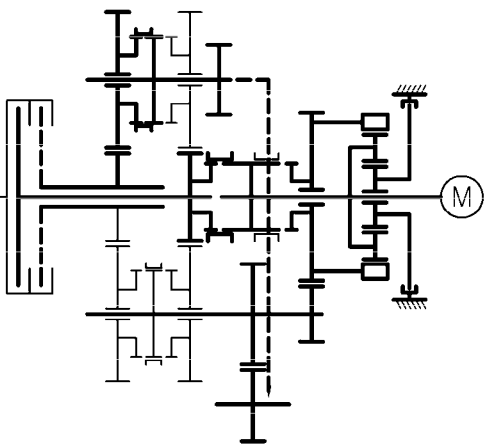

FIGS. 3A-D illustrate a procedure of shifting a gear from the second gear to the third gear. When a command for shifting to the third gear is generated in the traveling state at the second gear shown in FIG. 3A, the third-sixth synchronizer 3&6S connects the third driven gear P3 to the second output shaft OUT2, as illustrated in FIG. 3B, and the second clutch CL2 begins to slip, as illustrated in FIG. 3C.

As the second clutch CL2 is coupled and the first clutch CL1 is released, the traveling state at the third-gear is achieved, as illustrated in FIG. 3D.

Figure 4A:
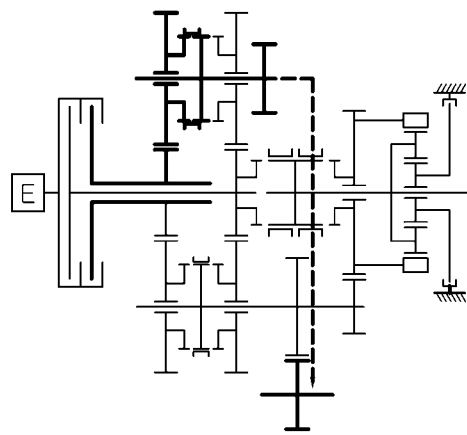
FIG. 4A, FIG. 4B, FIG. 4C and FIG. 4D are views exemplarily illustrating a procedure of shifting a gear from the third gear to a fourth gear in the hybrid powertrain shown in FIG. 1.
Figure 4B:
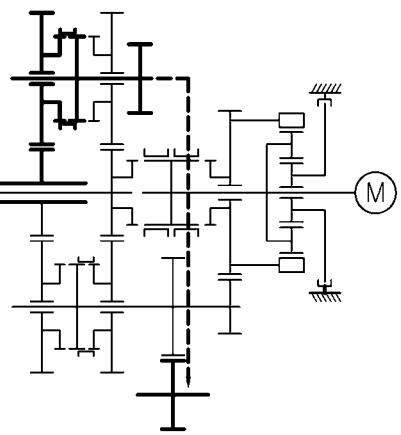
Figure 4D:
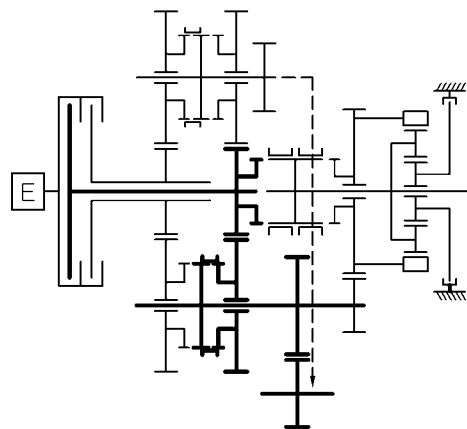
Figure 4C:
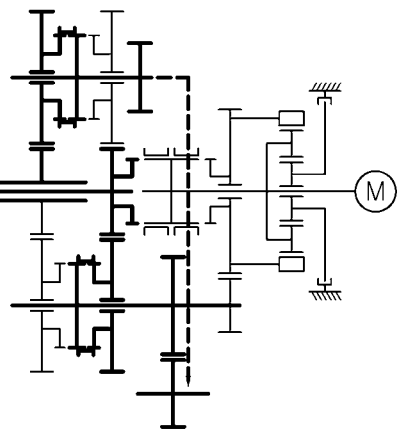

FIGS. 4A-4D illustrate a procedure of shifting a gear from the third gear to the fourth gear. When a command for shifting to the fourth gear is generated in the traveling state at the third gear, as shown in FIG. 4A, the fourth-fifth synchronizer 4&5S connects the fourth driven gear P4 to the first output shaft OUT1, as illustrated in FIG. 4B, and the first clutch CL1 begins to slip, as illustrated in FIG. 4C.

As the first clutch CL1 is coupled and the second clutch CL2 is released, the traveling state at the fourth gear is achieved, as illustrated in FIG. 4D.

Figure 5A:
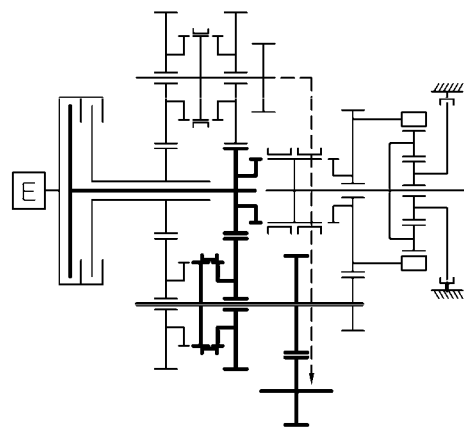
FIG. 5A, FIG. 5B, FIG. 5C, FIG. 5D and FIG. 5E are views exemplarily illustrating a procedure of shifting a gear from the fourth gear to a fifth gear in the hybrid powertrain shown in FIG. 1.
Figure 5B:
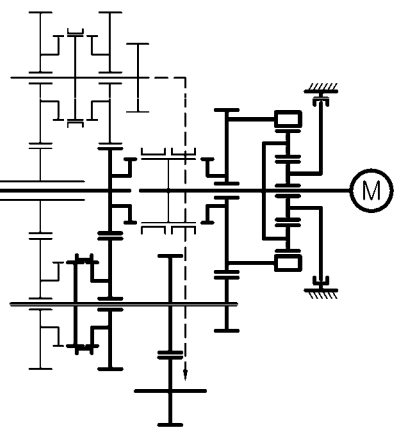
Figure 5E:
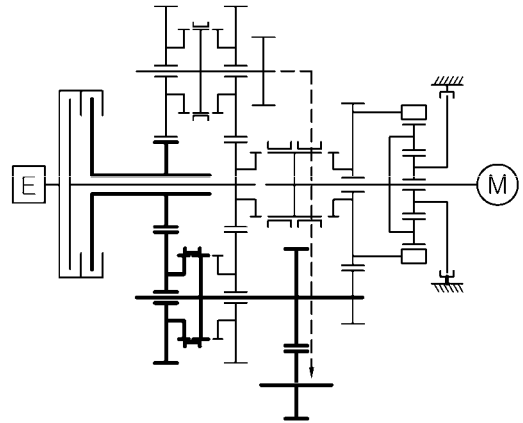

FIGS. 5A-5E illustrate a procedure of shifting a gear from the fourth gear to the fifth gear. When a command for shifting to the fifth gear is generated in the traveling state at the fourth gear shown in FIG. 5A, the motor M is driven in the state in which the brake BK is coupled, and the first output shaft OUT1 is driven in the traveling state at the fourth-gear by the variable drive gear VD and the variable driven gear VP, as illustrated in FIG. 5B.

Figure 5C:
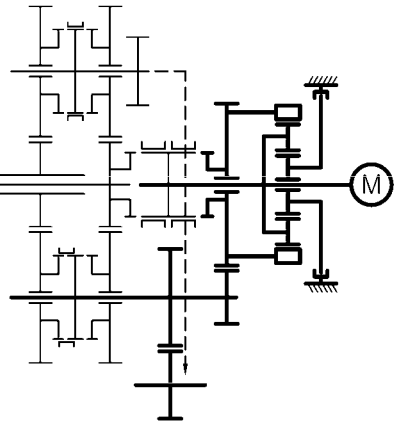

Subsequently, as illustrated in FIG. 5C, the first clutch CL1 is released, and the fourth-fifth synchronizer 4&5S is released from the fourth driven gear P4 while the traveling state at the fourth gear is maintained only by the driving force from the motor M, connecting the fifth driven gear P5 to the first output shaft OUT1.

Figure 5D:
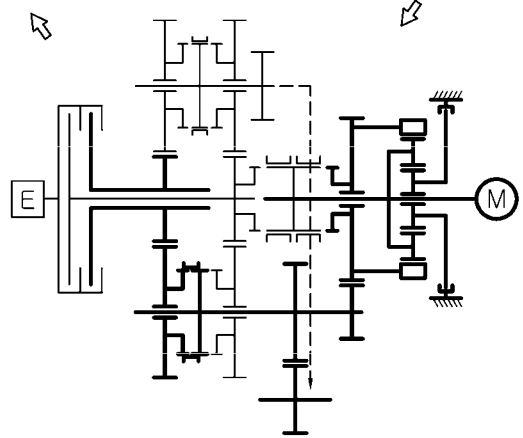

The second clutch CL2 is coupled, and the traveling state at the fifth gear is established, as illustrated in in FIG. 5D. When the connection to the motor M is released, the traveling state at the fifth gear is established only by the power from the engine E, as illustrated in in FIG. 5E.

According to the exemplary embodiment of the present invention, upon gear shifting from the fourth gear to the fifth gear, the state in which the fourth-fifth synchronizer 4&5S connects the fourth driven gear P4 to the first output shaft OUT1 is released to the neutral state. Subsequently, when the fifth driven gear P5 is connected to the first output shaft OUT1, torque interruption, in which the power from the engine E is blocked and is not transmitted to the drive wheel, may occur. However, since the exemplary embodiment of the present invention is constructed such that the power is continuously transmitted to the first output shaft OUT1 from the motor M, it is possible to ensure smooth gear shifting without torque interruption.

Figure 6A:
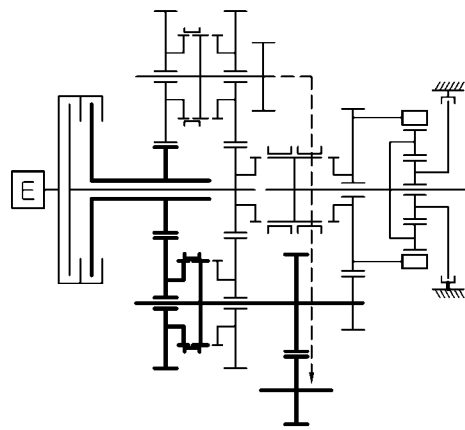
FIG. 6A, FIG. 6B, FIG. 6C and FIG. 6D are views exemplarily illustrating a procedure of shifting a gear from the fifth gear to a sixth gear in the hybrid powertrain shown in FIG. 1.
Figure 6B:
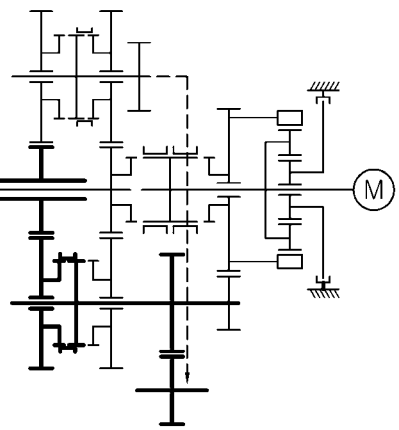
Figure 6D:
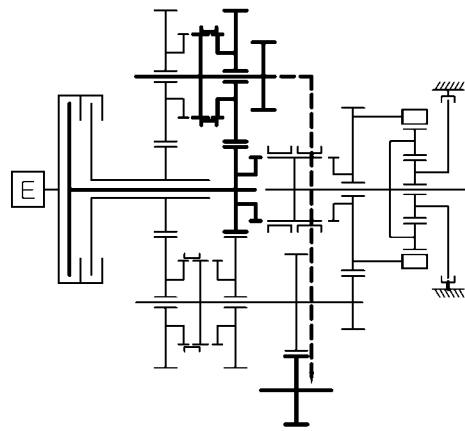
Figure 6C:
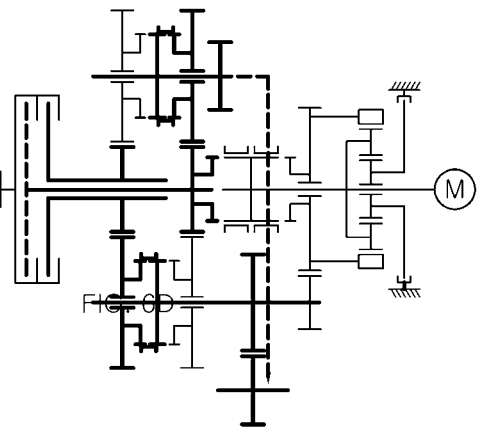

FIGS. 6A-6D illustrate a procedure of shifting a gear from the fifth gear to the sixth gear. When a command for shifting to the sixth gear is generated in the traveling state at the fifth gear shown in FIG. 6A, the third-sixth synchronizer 3&6S connects the sixth driven gear P6 to the second output shaft OUT2, as illustrated in in FIG. 6B, and the first clutch CL1 begins to slip, as illustrated in FIG. 6C.

When the first clutch CL1 is coupled and the second clutch CL2 is released, the traveling state at the sixth gear is established, as illustrated in FIG. 6D.

Figure 7:
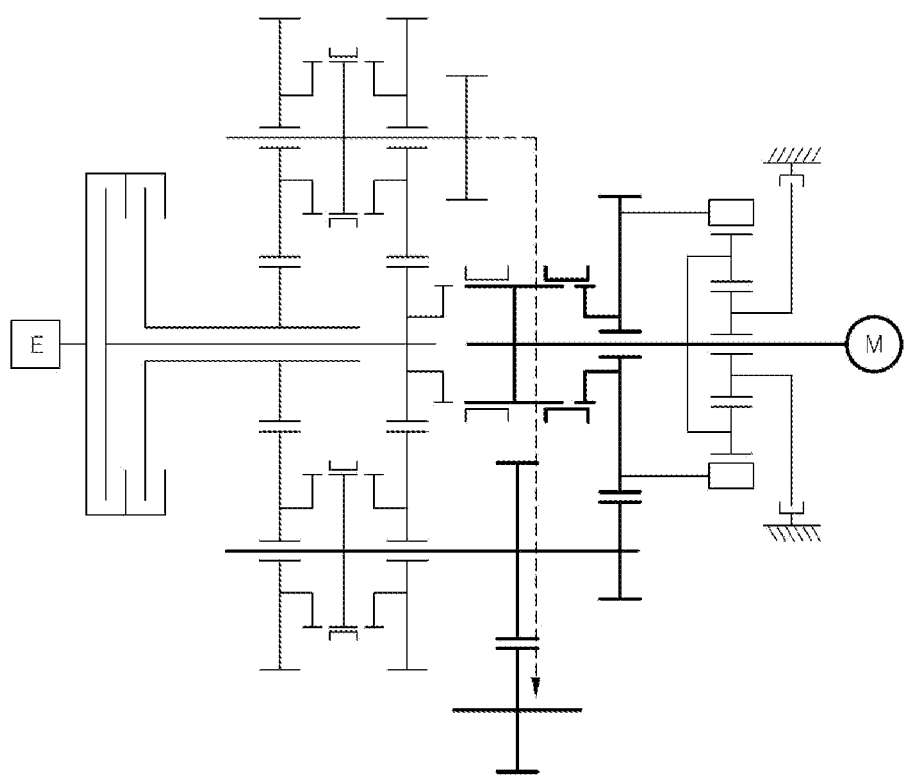
FIG. 7 is a view exemplarily illustrating the state in which an EV first gear is established in the hybrid powertrain shown in FIG. 1.
Figure 8:
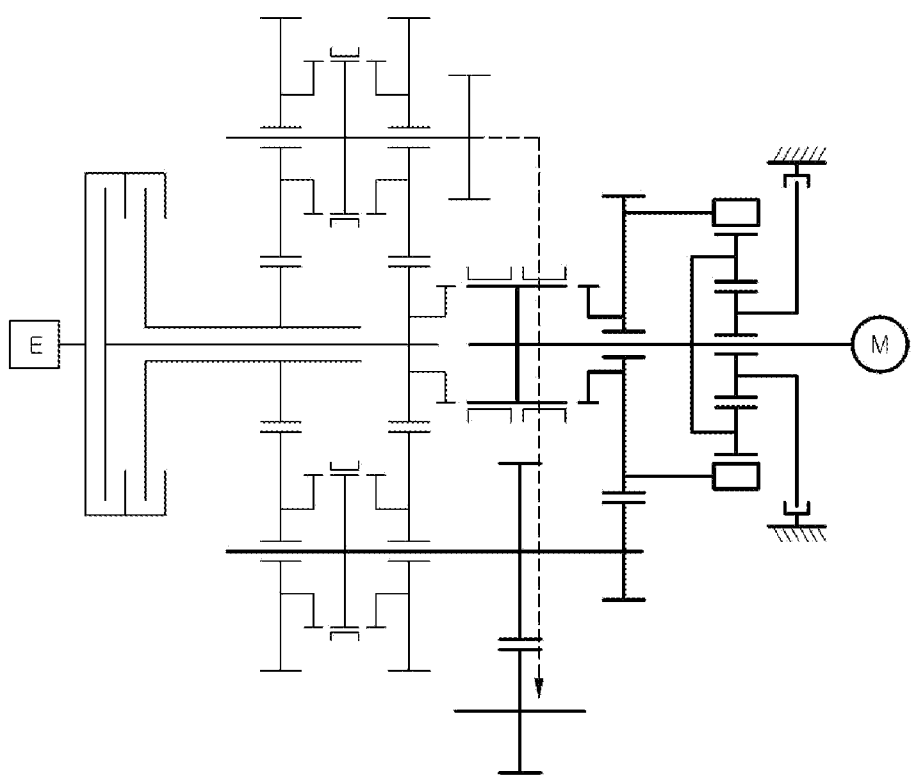
FIG. 8 is a view exemplarily illustrating the state in which an EV second gear is established in the hybrid powertrain shown in FIG. 1.

FIG. 7 and FIG. 8 illustrate states in which an EV first gear and an EV second gear are established in the hybrid powertrain shown in FIG. 1

In the EV first gear shown in FIG. 7, the motor M is driven in the state in which the second sleeve SB2 of the complex synchronizer CS connects the variable drive gear VD to the motor input shaft MI, and thus the variable drive gear VD is rotated at the same speed as the motor input shaft MI. In the EV second gear shown in FIG. 8, the brake BK is coupled and the motor M is driven in the state in which the second sleeve SB2 is released to the neutral state, and thus the speed of the variable drive gear VD is increased compared to the speed of the motor input shaft MI.

The EV first gear in FIG. 7 and the EV second gear in FIG. 8 may become reverse speeds of the vehicle by reverse rotation of the motor M.

It goes without saying that the hybrid powertrain according to the exemplary embodiment of the present invention is configured for realizing the hybrid mode in which the motor M is driven to supplement the power from the engine E in the state in which the variable drive gear VD is connected to the motor input shaft MT via the second sleeve SB2 of the complex synchronizer CS at all of the first gear to the sixth gear in which the power from the engine E is output via the first output shaft OUT1 or the second output shaft 2.

As is apparent from the above description, according to the exemplary embodiment of the present invention, since an engine clutch for performing coupling and separation between the engine and the motor is omitted, it is possible to reduce manufacturing costs and weight of the vehicle. Furthermore, since the motor is controlled independently of the engine, optimal operation of the motor as well as the engine is possible. Furthermore, since the power transmission path between the motor and the drive wheel is shortened upon regenerative braking, it is possible to improved efficiency of an EV mode and of regenerative braking.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain for a vehicle, the powertrain comprising:
   a first input shaft selectively connectable to an engine via a first clutch;
   a second input shaft selectively connectable to the engine via a second clutch and coaxially mounted with the first input shaft;
   a motor input shaft coaxially mounted with the first input shaft and connected to a motor;
   first and second output shafts, each of which is mounted in parallel to the first input shaft and the second input shaft;
   a variable drive gear mounted at the motor input shaft to transmit power from the motor input shaft to the first output shaft in a state in which a rotation speed of the motor input shaft is maintained or increased,
   a complex synchronizer configured to separately perform coupling and separation between the first input shaft and the motor input shaft and coupling and separation between the variable drive gear and the motor input shaft; and
   a plurality of gear pairs, which is configured to respectively define different gear ratios between the first input shaft and the first output shaft, between the first input shaft and the second output shaft, between the second input shaft and the first output shaft and between the second input shaft and the second output shaft,
   wherein a plurality of gear ratios between the plurality of gear pairs and two gear ratios between the variable drive gear and the first output shaft form a series of gear ratios, which is employed in driving of the vehicle.

2. The powertrain according to claim 1, wherein the variable drive gear is rotatably mounted at the motor input shaft.

3. The powertrain according to claim 1, wherein the complex synchronizer includes:
   a hub mounted on the motor input shaft; and
   first and second sleeves, each of which is mounted on the hub to be independently slidable in an axial direction of the hub.

4. The powertrain according to claim 2, further including:
   a planetary gear set connected to the motor input shaft,
   wherein the planetary gear set includes:
      a first rotation element rotatably mounted on the motor input shaft and selectively connectable to a transmission housing by a brake;
      a second rotation element engaged to the first rotation element and fixedly connected to the motor input shaft; and
      a third rotation element engaged to the second rotation element and fixedly connected to the variable drive gear.

5. The powertrain according to claim 4, wherein the first rotation element is a sun gear, the second rotation element is a planet carrier, and the third rotation element is a ring gear.

6. The powertrain according to claim 3,
   wherein the variable drive gear includes a clutch gear configured for being selectively engageable with the second sleeve of the complex synchronizer.

7. The powertrain according to claim 6,
   wherein the complex synchronizer forms a synchronizer configured for connecting the motor input shaft to the first input shaft through synchronizing action by a synchronizer ring while the first sleeve is moved in the axial direction, and
   wherein the second sleeve forms a dog clutch with the clutch gear of the variable drive gear.

8. The powertrain according to claim 3,
   wherein the series of gear ratios includes a first-speed gear ratio, a second-speed gear ratio, a third-speed gear ratio, a fourth-speed gear ratio, a fifth-speed gear ratio, and a sixth-speed gear ratio,
   wherein the plurality of gear pairs includes a first gear pair, a second gear pair, a third gear pair and a fourth gear pair,
   wherein the first gear pair between the first input shaft and the first output shaft is configured to define the fourth-speed gear ratio,
   wherein the second gear pair between the first input shaft and the second output shaft is configured to define the sixth-speed gear ratio,
   wherein the third gear pair between the second input shaft and the first output shaft is configured to define the fifth-speed gear ratio,
   wherein the fourth gear pair between the second input shaft and the second output shaft is configured to define the third-speed gear ratio, and
   wherein the variable drive gear transmits power to the first output shaft at the first-speed gear ratio and the second-speed gear ratio.

9. The powertrain according to claim 8,
   wherein the first gear pair and the second gear pair include a first drive gear mounted in the first input shaft, the first drive gear used in common to implement the fourth-speed gear ratio and the sixth-speed gear ratio,
   wherein the third gear pair and the fourth gear pair include a second drive gear mounted in the second input shaft, the second drive gear used in common to implement the third-speed gear ratio and the fifth-speed gear ratio,
   wherein the first gear pair further includes a fourth driven gear rotatably mounted on the first output shaft, the fourth driven gear engaged with the first drive gear, and the third gear pair further includes a fifth driven gear rotatably mounted on the first output gear and engaged with the second drive gear, and
   wherein the second gear pair further includes a sixth driven gear rotatably mounted in the second output shaft, the sixth driven gear engaged with the first drive gear, and the fourth gear pair further includes a third driven gear rotatably mounted on the second output gear and engaged with the second drive gear.

10. The powertrain according to claim 9,
wherein the first drive gear is fixedly mounted on the first input shaft, and
wherein the second drive gear is fixedly mounted on the second input shaft.

11. The powertrain according to claim 9,
wherein the first output shaft is mounted with a fourth-fifth synchronizer configured to selectively connect the fourth driven gear or the fifth driven gear to the first output shaft to restrict rotation thereof relative to the first output shaft, and
wherein the second output shaft is mounted with a third-sixth synchronizer configured to selectively connect the third driven gear or the sixth driven gear to the second output shaft to restrict rotation thereof relative to the second output shaft.

12. The powertrain according to claim 9, wherein the first drive gear is integrally mounted with a clutch gear, which is selectively engageable with the first sleeve of the complex synchronizer.

13. The powertrain according to claim 1,
wherein the first output shaft is fixedly mounted with a first output gear,
wherein the second output shaft is fixedly mounted with a second output gear, and
wherein the first output gear and the second output gear are engaged with a ring gear of a differential.

14. The powertrain according to claim 1,
wherein the first clutch and the second clutch form a dual clutch formed at a single clutch housing, and
wherein the second input shaft includes a hollow shaft surrounding the first input shaft.

* * * * *